(12) United States Patent
Bott et al.

(10) Patent No.: US 6,409,929 B2
(45) Date of Patent: *Jun. 25, 2002

(54) STEAM DRYING OF ROTARY FILTER CAKES WITHOUT CRACK FORMATION

(75) Inventors: Reinhard Bott, Karlsruhe; Robert Kern, Weingarten; Thomas Langeloh, Karlsruhe, all of (DE)

(73) Assignee: BOKELA Ingenieurgesellschaft fur Mechanische Verfahrenstechnik mbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/815,185

(22) Filed: Mar. 11, 1997

Related U.S. Application Data

(63) Continuation of application No. 08/631,967, filed on Apr. 15, 1996, now abandoned, which is a continuation of application No. 08/631,937, filed on Apr. 15, 1996, now abandoned, which is a continuation of application No. 08/432,169, filed as application No. PCT/EP93/03148 on Nov. 10, 1993, now abandoned.

(30) Foreign Application Priority Data

Nov. 11, 1992 (DE) .......................................... 42 38 087

(51) Int. Cl.⁷ .............................................. B01D 37/00
(52) U.S. Cl. ....................... 210/770; 210/771; 210/780; 210/784; 210/398; 210/402; 210/177; 34/413; 34/499; 34/510
(58) Field of Search ................................ 210/770, 771, 210/772, 774, 398, 402, 177, 780, 784; 34/413, 499, 510

(56) References Cited

U.S. PATENT DOCUMENTS

| | | | | |
|---|---|---|---|---|
| 1,774,044 A | * | 8/1930 | Sweetland ................. 210/398 |
| 3,592,341 A | * | 7/1971 | Emmett, Jr. et al. ........ 210/179 |
| 3,672,067 A | * | 6/1972 | Emmett, Jr. et al. |
| 3,698,556 A | * | 10/1972 | Emmett, Jr. et al. |
| 3,744,543 A | * | 7/1973 | Emmett, Jr. et al. |
| 3,981,978 A | | 9/1976 | Weiler et al. |
| 4,017,399 A | | 4/1977 | Lopker |
| 4,115,265 A | * | 9/1978 | Otte et al. .................... 210/180 |
| 4,695,381 A | * | 9/1987 | Ragnegard .................. 210/403 |
| 4,759,858 A | * | 7/1988 | Stahl .......................... 210/771 |
| 4,818,415 A | * | 4/1989 | Kramer et al. ............... 210/770 |
| 4,837,944 A | * | 6/1989 | Bott ........................... 210/771 |
| 4,995,972 A | * | 2/1991 | Kramer et al. ............... 210/179 |
| 5,094,012 A | * | 3/1992 | Rosenstock et al. |
| 5,540,846 A | * | 7/1996 | Koch et al. |
| 5,643,468 A | * | 7/1997 | Ure ............................ 210/398 |
| 5,676,847 A | * | 10/1997 | Yamamoto et al. .......... 210/398 |
| 5,707,512 A | * | 1/1998 | Koch et al. .................. 210/398 |
| 6,033,579 A | * | 3/2000 | Riemer et al. ............... 210/398 |

FOREIGN PATENT DOCUMENTS

| | | |
|---|---|---|
| DE | 15760 IVc/12d | 11/1956 |
| DE | 1 219 905 | 6/1966 |
| DE | 1 177 572 | 2/1968 |
| DE | 1 461 502 | 1/1969 |
| DE | 29 47 329 C2 | 1/1982 |
| DE | 3 614 668 A1 | 12/1988 |
| DE | 39 37 952 A1 | 5/1991 |
| EP | 0 179 446 | 4/1986 |
| FR | 2 074 317 | 1/1971 |
| WO | WO 89/07972 | 9/1989 |

OTHER PUBLICATIONS

Translation of German Patent No. 2,947,329 A1; PTO–95–2413; Translation Date Jan. 19, 1995, May 1981.*

* cited by examiner

Primary Examiner—Robert J. Popovics
(74) Attorney, Agent, or Firm—Cantor Colburn LLP

(57) ABSTRACT

Apparatus and a method are presented for the mechanical removal of moisture from a filter cake. Differential pressure causes the flow of a treatment fluid through the filter cake. The treatment fluid displaces liquid originally present in the filter cake to prevent cracking of the filter cake.

5 Claims, 1 Drawing Sheet

STEAM DRYING OF ROTARY FILTER CAKES WITHOUT CRACK FORMATION

RELATION TO OTHER APPLICATIONS

This application a continuation of U.S. application Ser. No. 08/631,967, filed Apr. 15, 1996 now abandoned which is a continuation of U.S. application Ser. No. 08/631,937 filed Apr. 15, 1996 now abandoned which is a continuation of U.S. application Ser. No. 08/432,169, filed May 10, 1995 now abandoned and claiming priority under 35 USC 371, to PCT Application PCT/EP93/03148 filed Nov. 10, 1993 and to German Application No. P42 3 8 087.1 filed Nov. 11, 1992.

BACKGROUND OF THE INVENTION

The invention relates to a method for the mechanical removal of moisture from a filter cake, wherein a treatment fluid flows through the filter cake as a result of a difference in pressure, and to an apparatus for implementing the method.

In existing filtration by differential gas-pressure, shrinkage cracks often occur during the moisture-removal phase, thereby considerably impairing the result of filtration. As a result of the physical/chemical composition of solid and liquid, characteristic crack patterns often form on the surface.

These cracks, which in most cases extend through the entire filter cake as far as the filter cloth, mainly occur when processing fine-grain, especially mineral, solid materials, having a complex chemical structure. It is to be assumed that crack formation is governed by capillary forces, by an electrostatic interaction between particles, as well as by the pH value and by the nature and concentration of the ions in the liquid contained in the filter cake. Cracking behavior is also affected, for example, by the filtration pressure-difference, the height of the cake and by the filter cloth.

The occurrence of cracking has a negative effect on further treatment of the filter cake. Thus, both in vacuum filtration and in pressure filtration, a bypass flow of air takes place through the cracks produced. Cake washing deteriorates drastically, since the washing fluid prefers to pass through the cracks rather than through the accumulated material being washed.

To prevent crack formation in cake-forming filters, it is known that the filter cake can be compressed by the external application of compressive forces, thereby reclosing open cracks. Another known possibility is to carry out further filtration through cracks which have formed, but this causes rewetting of the filter cake which has already formed, and consequently causes fresh cracking.

A further possibility for preventing crack formation consists in adding small quantities of solid substances, such as cellulose or glass fibres, to the suspension being filtered, which, however, because of the cost involved or the negative effect on the purity required in the substance produced, can only rarely be implemented.

It is known from EP 0 179 446 B1 (corresponding to U.S. Pat. No. 4759858) that, in order to prevent crack formation, a filtering medium can be designed, in which, by providing non-filtering bars on the filtering medium, a division into filtration areas is achieved, with an associated division of the filter cake produced into a plurality of small sections.

SUMMARY OF THE INVENTION

It is the aim of this invention to create a method of the type mentioned earlier, which permits filtration with moisture removal and washing of the filter cake by a very low consumption of treatment fluid. A further aim is to present an apparatus for the implementation of this method.

Procedurally, the aim is achieved by the characterizing features presented in claim 1. In this method, the treatment fluid condenses in the filter cake, wherein the mother liquid originally present in the filter cake is displaced, and wherein at the same time further impurities are washed out of the filter cake. Replacement of the mother liquid by the treatment fluid ensures that no crack formation occurs.

A particular development, in which a piston-flow-like displacement of the mother liquid from the filter cake is executed, is advantageous. Ideally, a sharp displacement front forms between the mother liquid and the treatment fluid.

Repetition of this flow-through process after intermediate cooling of the filter cake increases the efficiency of the method, especially in respect of the washout effect.

If the treatment fluid has the properties of a low ionic strength, a low ion concentration and a mild, essentially neutral pH value, the mother liquid between the individual particles of the filter cake is largely replaced by a largely neutral fluid. The electrical interaction between the particles is thereby weakened, and a smaller distance between the solid bodies is made possible. The cake shrinks as moisture removal progresses. At a degree of saturation of approximately 80%, the tensile stresses reach a maximum, and crack formation occurs, if the liquid bridges between two or more particles can no longer absorb the forces.

The shrinkage of the filter cake, and thereby the tendency towards cracking during moisture removal, increase with the distance between the particles at the start of or during moisture removal. The reasons why the particles are not always in mutual contact when the cake is formed include electrostatic interaction between the particles and between the particles and mother liquid. These interactions increase in significance the smaller the particles are. They are also affected by the electric charge of the particles, by the ionic strength and the pH value of the liquid contained in the filter cake, so that replacement of mother liquid by a treatment fluid with the properties according to the invention, executed in the method according to the invention, produces a greater particle density and thereby a reduction of the tensile stresses between the particles, which reduces the risk of crack formation.

It is also an advantage for the treatment fluid, or the treatment liquid produced from it by condensation, to have a great capacity to absorb volatile or soluble substances from the filter cake. In this sense, solvents such as alcohol, acetone, sulphuric acid or soda lye can be used as the treatment fluid. In this way, such substances are washed out or extracted, without the need for prior removal of moisture from the filter, with the risk of crack formation.

Further advantageous developments of the method according to the invention are described in the dependent claims.

An alternative apparatus for implementing the method according to the invention is given in the apparatus claim. The filter cake is exposed to treatment fluid under a hood, the rest of the area being exposed to a different gas.

In processes of pressure filtration or enclosed vacuum-filtration, the entire process area, or more advantageously, within the process area, only the treatment area separated by an internal additional enclosure above the filter cake, is exposed to the treatment fluid. According to a further development, the gas exchange between the two pressurechambers is minimized, without having to provide expensive seals. The low thermal conductivity of the gas contained in the first pressure-chamber provides thermal insulation of the filter cake from the external environment of the apparatus, thereby increasing its efficiency.

BRIEF DESCRIPTION OF THE DRAWINGS

The invention is described below, by reference to an example, referring to the drawing. The drawing shows.

DESCRIPTION OF THE PREFERRED EMBODIMENTS

Figure 1:
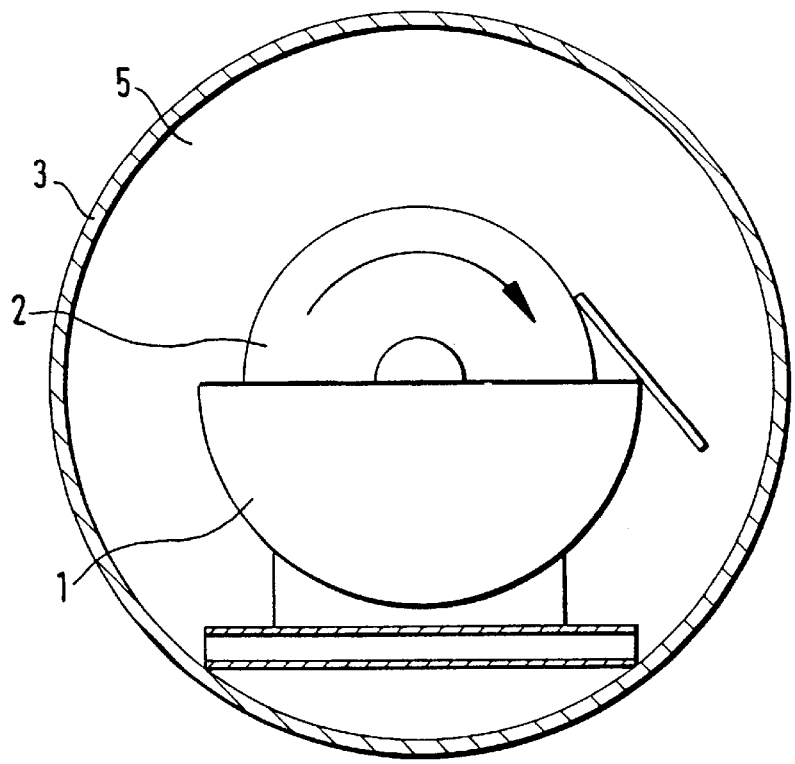
FIG. 1 a cross-section through a first apparatus for the implementation of the method, and FIG. 2 a cross-section through a second apparatus for the implementation of the method.

A first embodiment of an apparatus for implementing the method according to the invention is shown in FIG. 1. There, a drum filter 2 is completely fitted in a pressure-tight housing 3 enclosing a first pressure-chamber 5. During service, pressure chamber 5 is completely filled with the gaseous treatment fluid. The gaseous treatment fluid brings about the steps of cake formation, washing and moisture removal in the method.

Figure 2:
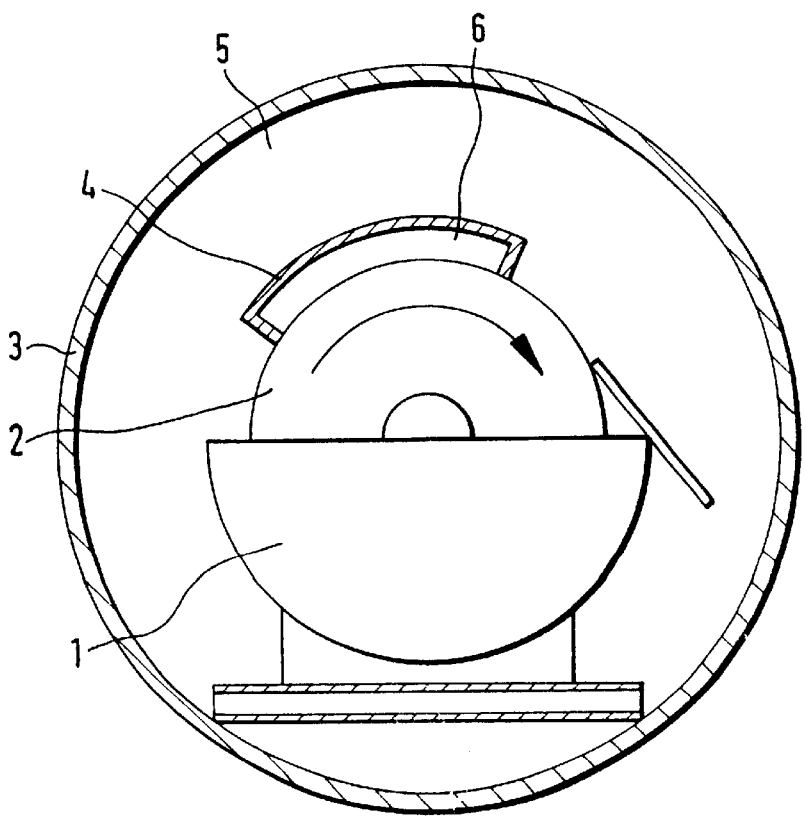

FIG. 2 shows an alternative embodiment of an apparatus for implementing the method according to the invention, in which a drum filter 2 rotates in a suspension trough 1. Here too, the suspension trough 1 and drum filter 2 are surrounded by a housing 3 enclosing a pressure chamber 5. The pressure chamber 5 is filled with a pressurized gas, which is gaseous under ambient conditions. This gas produces the differential pressure required for cake formation and for moisture removal.

In an area of the periphery of the filter drum outside the suspension trough, a hood 4 is provided, covering this peripheral section of the drum filter 2 and, together with the peripheral section of the drum filter and the outer area of the filter cake lying thereon, encloses a second pressure-chamber 6. This pressure-chamber 6 encloses individual process-areas during cake treatment but also the entire procedural section outside cake formation. In this case, even cake formation can be brought about by th e pressure of the treatment fluid.

In th e second pressure-chamber 6 is the gaseous treatment fluid, which preferably has the task of washing the cake and of extracting soluble substances from it, while avoiding crack formation. Between the second pressure-chamber 6 and the first pressure-chamber 5, there is almost no difference in pressure, so that overflow of the different cases is kept small. Besides other advantageous effects, a low thermal conductivity of the gas in the first pressure-chamber 5 prevents heat losses of the treatment fluid and thereby premature condensation.

Crack formation usually occurring during the removal of moisture from a filter cake causes a deterioration of the result of the process. The moisture-removal air then seeks the path of least resistance, producing a bypass through the cracks formed, instead of through the capillaries of the filter cake from which moisture is to be removed. The capacity limit of the compressor generating the filtration pressure-difference can be quickly reached, followed as a further consequence by a drop in the applied differential-pressure . This results in a low mass throughput of the filter, with an increasing residual moisture-content and possible resultant inadequate moisture-removal.

Also, when the filter cake is being washed, a large proportion of the washing liquid then flows unused through the cracks, as a result of which the desired degree of wash-out is not achieved. What is more, the cost of series-connected thermal drying increases with a higher residual moisture-content of the cake. In addition, with inadequate washing, the washing-liquid requirement of the filter increases, and an additional cleaning stage may be necessary.

In the filtration process according to the invention, the gas phase of a liquid is used for mechanical moisture-removal by means of differential pressure. Under the pressure and temperature conditions prevailing at the underside of the filter cake, this is preferably liquid, but the gas phase in the filter cake condenses as a result of a decay in the differential pressure. The filtered filter cake is still exposed to the treatment fluid prior to pore emptying and the onset of shrinkage. Cake formation can, however, also take place using this treatment fluid.

The temperature of the treatment fluid above the filter cake can be considerably higher than the ambient temperature for the treatment fluid to be in gaseous form. Since a differential pressure is required for the formation of the filter cake and for moisture removal, the pressure of the treatment fluid in its caseous state can be higher than the normal pressure in the vicinity. The thermodynamic state-point of the gas should not, however, be all that far from the condensation point. If, after formation of the filter cake from a suspension, whose temperature is below that of the treatment fluid in a gaseous state, the saturated filter cake is brought into contact with the gaseous treatment fluid, then the treatment fluid will penetrate into the filter cake as a result of the applied pressure-difference.

In the filter cake, the gaseous treatment fluid quickly cools on the colder pore-surfaces and at the liquid surfaces. Pores just produced, which were filled with the gas, are now filled with the condensate of the treatment fluid. In this area, filter cake remains saturated. Heat is continuously supplied to the filter cake by the condensation enthalpy released, so that its temperature in the condensation zone rises to the gas temperature. During this heating process, the mother liquid originally present is ejected by continuously produced condensate of the treatment fluid, as a result of the filtration pressure-difference.

The processes described initially only take place in the topmost layer of the filter cake, which is in direct contact with the gaseous treatment fluid. Immediate further penetration of the gaseous treatment fluid into deeper layers of the filter cake is prevented by cooling and condensation. Thus these processes only take place in a narrow area: a condensation front.

As soon as the filter cake within the condensation front has been heated up to the gas temperature by the condensation enthalpy, the pores remain filled with gas, and the condensation front moves a bit further into the interior of the filter cake. The front gradually passes through the entire filter cake as far as the filter medium.

By virtue of a low ionic strength and ion concentration, together with a "mild", essentially neutral pH value, electrical interactions between the particles of the filter cake are reduced. In addition, the pure condensate has a great capacity for washing out or extracting soluble substances from the filter cake.

Whereas, in usual filtration systems , two components, solid and liquid, are separated from each other, in the case of washing, a further component, the washing liquid or treatment fluid, is also involved in the process. In the method according to this invention, the possibility now exists of implementing a more complex separating method for systems with even more components. It is thus conceivable that, in addition to solid substance, mother liquid and treatment fluid, a further substance or several substances may be in the filter cake, which can of course be extracted with the treatment fluid. In this case, extraction of a fourth or further components can take place due to the free through flow of steam/vapour occurring in the method according to the invention.

If, after passage of the condensation front, the desired degree of wash-out has not been achieved, the possibility exists of intermediate cooling of the filter cake by spraying it with a cold liquid, and causing a further condensation front to pass through again.

What is claimed is:

1. A method for the removal of moisture from a filter cake formed on a filtering surface of a filtering apparatus comprising:

a rotatable filter including a filtering surface on which said filter cake is formed;

a suspension trough in which said filter is rotatably positioned;

a pressure tight housing in which said suspension trough and said filter are completely enclosed in a pressure tight manner, said pressure tight housing defining a first pressure chamber filled with a pressurized first gas at a pressure above atmospheric, said first gas being used for generating a differential pressure for forming the filter cake on said filter;

a hood positioned within said pressure tight housing, said hood covering at least a section of said filtering surface, thereby defining a second pressure chamber, said second pressure chamber containing gaseous treatment fluid which is different from the first gas, said gaseous treatment fluid being heated vapour for treating said filter cake, the method comprising:

presenting the filter cake in a liquid saturated state saturated with a mother liquid; exposing and condensing the gaseous treatment fluid to form a liquid phase of the treatment fluid while the filter cake is in a liquid saturated state saturated with the mother liquid; wherein a pressure and temperature of the treatment fluid is set such that;

a thermodynamic state-point of the gaseous treatment fluid is near a condensation point of the gaseous treatment fluid;

the treatment fluid initially penetrates into a top layer of the filter cake furthest away from the filtering surface, cools and condenses thereby forming a condensation front in an area of the filter cake; the filter cake is progressively heated up by the treatment fluid to the temperature of the gaseous treatment fluid from the top layer to the filtering surface; and the condensation front is displaced towards the filtering surface; and by displacing the condensation front the mother liquid is replaced by the treatment fluid.

2. The method of claim 1 wherein the gas phase of the treatment fluid generates a differential pressure between the treatment fluid and the filter cake.

3. The method of claim 1 wherein the treatment fluid permeates through the filter cake in stages.

4. The method of claim 1 wherein formation of the filter cake takes place using the treatment fluid as a source of pressure differential.

5. The method of claim 1 wherein the treatment fluid and a condensate produced therefrom having a neutral pH value is used, exhibiting a wash-out and extraction character for substances being extracted from the filter cake.

* * * * *

UNITED STATES PATENT AND TRADEMARK OFFICE
CERTIFICATE OF CORRECTION

PATENT NO. : 6,409,929 B2
DATED : June 25, 2002
INVENTOR(S) : Reinhard Bott et al.

It is certified that error appears in the above-identified patent and that said Letters Patent is hereby corrected as shown below:

Column 3,
Line 44, after "by" delete "th e" and insert -- the --.
Line 46, after "In" delete "th e" and insert -- the --.
Line 52, before "is" delete "cases" and insert -- gases --.

Column 4,
Line 36, after "with" delete "the".

Signed and Sealed this

Seventh Day of February, 2006

JON W. DUDAS
*Director of the United States Patent and Trademark Office*